United States Patent
Feng

(10) Patent No.: US 8,422,436 B2
(45) Date of Patent: Apr. 16, 2013

(54) METHOD AND APPARATUS FOR FORWARDING DATA IN FORWARDING NETWORKS

(75) Inventor: Shulan Feng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1042 days.

(21) Appl. No.: 11/812,633

(22) Filed: Jun. 20, 2007

(65) Prior Publication Data

US 2007/0297412 A1    Dec. 27, 2007

(30) Foreign Application Priority Data

Jun. 21, 2006   (CN) .......................... 2006 1 0082942

(51) Int. Cl.
  *H04W 4/00*   (2009.01)
(52) U.S. Cl.
  USPC ........... 370/329; 370/243; 370/274; 370/279; 370/293; 370/315; 370/492; 370/501; 455/11.1; 455/13.1; 455/15; 455/22; 455/25
(58) Field of Classification Search .................. 370/329, 370/243, 274, 279, 293, 315, 492, 501; 455/11.1, 455/13.1, 15, 22, 25
  See application file for complete search history.

(56) References Cited

U.S. PATENT DOCUMENTS

| | | | |
|---|---|---|---|
| 4,001,691 A * | 1/1977 | Gruenberg | 375/214 |
| 5,761,619 A | 6/1998 | Danne et al. | |
| 5,966,094 A * | 10/1999 | Ward et al. | 342/373 |
| 6,584,080 B1 * | 6/2003 | Ganz et al. | 370/315 |
| 6,816,115 B1 | 11/2004 | Redi et al. | |
| 2002/0051425 A1 | 5/2002 | Larsson | |
| 2002/0072329 A1 * | 6/2002 | Bandeira et al. | 455/7 |
| 2003/0050099 A1 * | 3/2003 | Izadpanah | 455/562 |
| 2004/0102219 A1 * | 5/2004 | Bunton et al. | 455/560 |
| 2006/0014491 A1 * | 1/2006 | Cleveland | 455/17 |
| 2006/0040611 A1 * | 2/2006 | Ding et al. | 455/11.1 |
| 2006/0057958 A1 * | 3/2006 | Ngo et al. | 455/7 |
| 2008/0089267 A1 * | 4/2008 | Zhu et al. | 370/315 |

FOREIGN PATENT DOCUMENTS

| | | |
|---|---|---|
| CN | 1185261 A | 6/1998 |
| CN | 1471776 A | 1/2004 |

* cited by examiner

*Primary Examiner* — Nimesh Patel

(57) ABSTRACT

A method for forwarding data in forwarding networks includes: acquiring a signal transmitted from a source node to a target node in the forwarding network; selecting an antenna which is closest to the target node or a subordinate forwarding node, according to a corresponding relationship between antennas and nodes in coverage areas of the antennas; sending the signal to the antenna selected through wire transmission media; and transmitting the signal by the antenna selected. An apparatus for forwarding data and a forwarding network are disclosed as well.

19 Claims, 4 Drawing Sheets

METHOD AND APPARATUS FOR FORWARDING DATA IN FORWARDING NETWORKS

CROSS-REFERENCE TO RELATED APPLICATIONS

This application claims priority of Chinese Patent Application No. 200610082942.4, filed Jun. 21, 2006, the disclosure of which is hereby incorporated by reference in its entirety.

FIELD OF THE TECHNOLOGY

The present invention relates to data transmission in the communication field, and more particularly, to a method and an apparatus for forwarding data in forwarding networks.

BACKGROUND OF THE INVENTION

In wireless communication systems, there are two types of network topologies based on different paths between a source and a target. In the first type of network topology, the source and the target can communicate with each other directly, an example for the first type of network topology is the cellular network topology, which is as shown in FIG. 1. In the second type of network topology, the source and the target may communicate with each other by data forwarding of a Relay Node (RN). Networks with the second network topology are generally called forwarding networks below. Relay networks, Ad hoc networks, mesh networks, etc. related in the current communication field all belong to the forwarding networks.

Based on the type of the data route, the forwarding network can be categorized as tree-like topology, mesh topology, hybrid topology, etc. The network with the hybrid topology is as shown in FIG. 2. According to the RNs' functions, RNs may be categorized as analog RN and digital RN. Furthermore, the digital RN includes active RN, half-active RN and passive RN.

The analog RN simply receives, amplifies signals, and then transmits the signals.

The active RN receives signals, processes the signals totally according to the control of the active RN, and then transmits the signals processed.

The half-active RN receives signals, processes the signals according to the control of the half-active RN and a controlling node of the half-active RN at the same time, and then transmits the signals processed.

The passive RN receives signals, processes the signals totally according to the control of a controlling node of the passive RN, and then transmits the signals processed.

As for the data transmission in forwarding networks, a typical manner is the hop-by-hop relay manner. That is, the data from super ordinate node is received via air interface and processed (the processing method may be different based on the different category of the node) by the current node, then the data is transmitted from one or more antennas of the current node and received by the subordinate node. As shown in FIG. 3, a forward network includes a Source Node (SN), three RNs (RN1, RN2, and RN3), and a plurality of Target Nodes (TNs). When the SN transmits data to the TN2, the data is transmitted through four hops (SN<->RN1, RN1<->RN2, RN2<->RN3, RN3<->TN2).

In forwarding networks with hop-by-hop relay manner, each RN occupies different radio resources (including time, frequency, codeword, space, and so on) for transmitting and receiving data. With this simple hop-by-hop relay manner, the system performance is improved, such as enlarging the coverage area, improving the user traffic, or increasing the system capacity, at the cost of occupying much more radio resources. Because each RN should occupy different radio resources for receiving and transmitting data, and neighboring nodes (or nodes within interference range) should use different radio resources to avoid degrading system performance incurred by increased system interference.

The prior art provides a forwarding node with a plurality of antennas. However, the inventor found in the inventing process that, the forwarding node in the prior art can not recognize the corresponding relationship between the antennas and the nodes in the coverage area of the antennas. Therefore, upon receiving data, the forwarding node in the prior art transmits data to designated areas by all antennas. Although the coverage area can be enlarged, user traffic can be improved, and the system capacity can be added when using this manner, a great amount of radio resources are still occupied. Moreover, a plurality of antennas transmit the same data will increase system interference in the forwarding network.

SUMMARY OF THE INVENTION

Embodiments of the present invention provide a method and an apparatus for forwarding data in forwarding networks, to save the radio resources occupied for forwarding data, and reduce system interference in the forwarding networks.

A method for forwarding data in a forwarding network includes:

acquiring a signal transmitted from a Source Node (SN) to a Target Node (TN) in the forwarding network;

selecting an antenna which is closest to the TN or to a subordinate forwarding node, according to a corresponding relationship between antennas and nodes in coverage areas of the antennas;

sending the signal to the antenna selected through wire transmission media; and transmitting the signal by the antenna selected.

An apparatus for forwarding data includes:

a plurality of antennas, configured to transmit and receive signals in designated areas respectively;

a plurality of link signal processing modules, each of which corresponds to one of the plurality of the antennas, configured to process signals received from the plurality of antennas and signals to be transmitted via the plurality of antennas;

a detecting module, configured to detect nodes in a coverage area of each antenna of the plurality of antennas, save a corresponding relationship between the nodes and the plurality of antennas, and select an antenna which is closest to a target node or to a subordinate forwarding node from the plurality of antennas according to the corresponding relationship between the nodes and the plurality of antennas to transmit a signal; and an antenna branch switching module, configured to send one of the signals to be transmitted to one of the plurality of link signal processing modules corresponding to the antenna selected by the detecting module.

A forwarding network includes:

a source node, configured to transmit a signal;

a target node, configured to receive the signal; and at least one forwarding node including a plurality of antennas for transmitting and receiving signals in designated areas respectively, configured to select an antenna which is closest to the target node or a subordinate forwarding node from the plurality of antennas of the at least one forwarding node, according to a corresponding relationship between nodes in coverage areas of the plurality of antennas and the plurality of antennas, to transmit the signal upon receiving the signal transmitted from the source node to the target node.

The above schemes provide the following advantages:

1. Networking is flexible, transmitting power of a node is reduced, coverage area is enlarged, and user capacity is increased, because some or all RN<->RN links are replaced with wire links;

2. The number of wireless link used for transmitting data is reduced, so that the radio resources occupied is reduced greatly, and the interference between multiple links is decreased, because only the antenna closest to the target node or the subordinate forwarding node is used to transmit data;

3. The hop number can be reduced by using the antenna closest to the target node or the subordinate forwarding node to transmit data. Thus the time for processing signals is saved, the complexity of the system is reduced, and the probability of data transmission with errors is reduced.

DETAILED DESCRIPTION OF THE INVENTION

According to embodiments of the present invention, in order to save radio resources occupied, reduce system interference, and reduce the hop number for forwarding data, for a forwarding network with a radio remote RN, an antenna of the radio remote RN which is closest to a target node TN or to a subordinate forwarding node is selected by the radio remote RN from all antennas of the radio remote RN. The radio remote RN forwards data from the antenna selected. The target node includes a user terminal.

Figure 1:
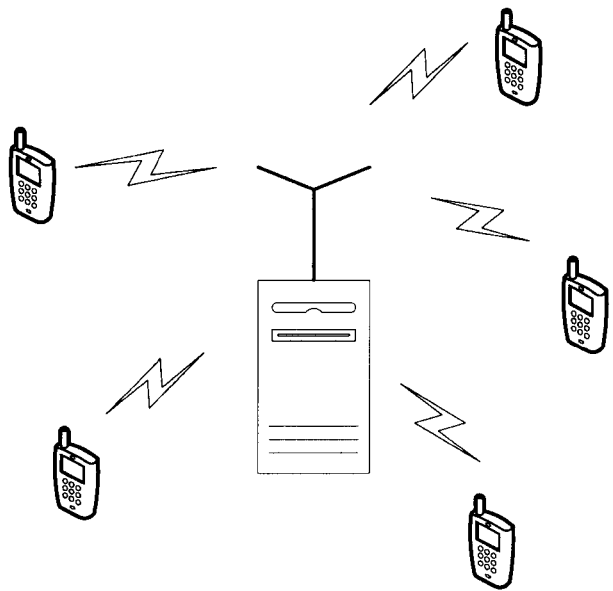
FIG. 1 is a schematic diagram illustrating a source and multiple targets communicate with each other directly in an existing cellular network topology.
Figure 2:
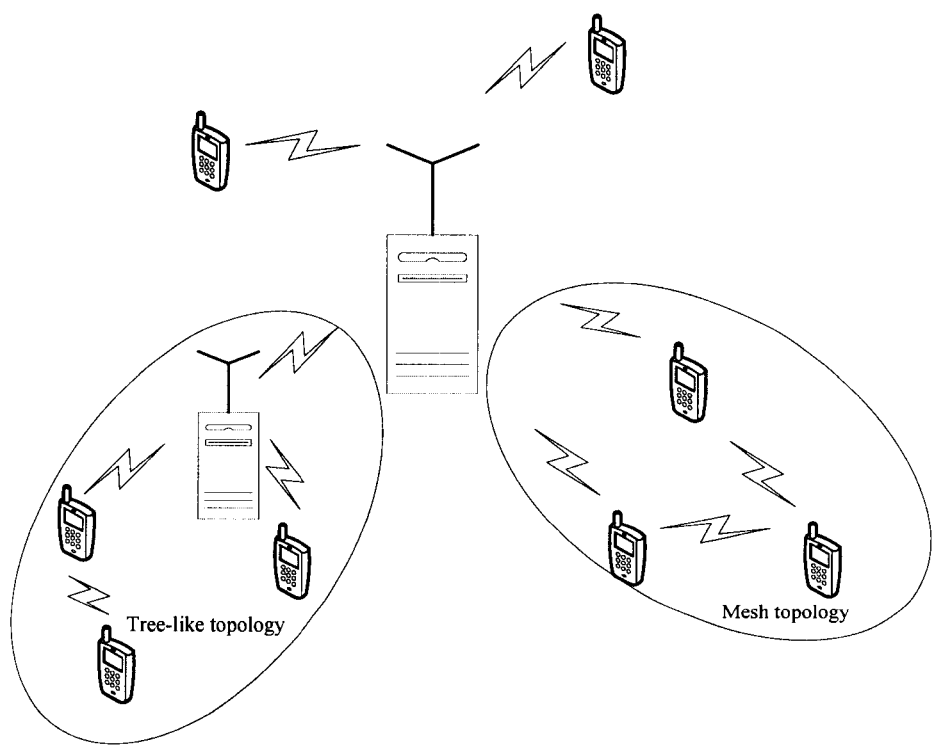
FIG. 2 is a schematic diagram illustrating an existing forwarding network with a hybrid topology.
Figure 3:
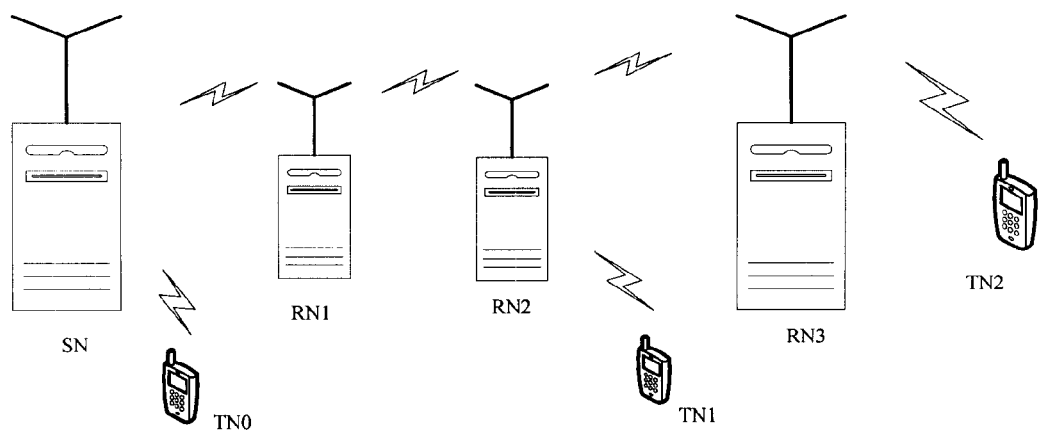
FIG. 3 is a schematic diagram illustrating the networking of an existing forwarding network.
Figure 4:
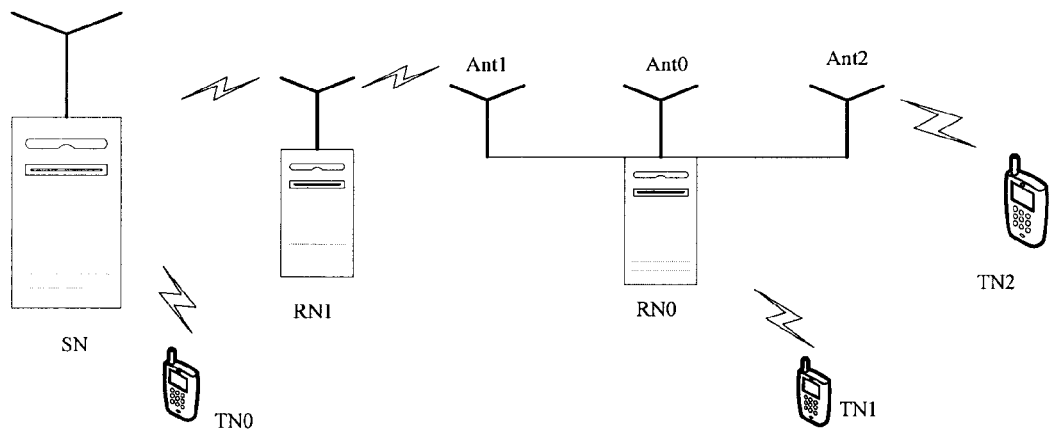
FIG. 4 is a schematic diagram illustrating the networking topology of a forwarding network according to an embodiment of the present invention.

As shown in FIG. 4, a branch of the forwarding network in an embodiment includes a source node SN, a simple relay node RN1, a remote radio relay node RN0, and TNs (i.e. user terminals) including TN0, TN1, and TN2.

For the remote radio relay node RN0, an antenna needs to be made remote part at least. The remote antenna and the main body of the node may be connected through fiber, cable, or other wire transmission media. In practice, the remote part can not only include antennas, but also include a radio processing module or an intermediate frequency processing module. The antennas can be a single antenna, a distributed antenna, or other types of antenna. The antenna also can be directional, omnidirectional antennas, or the like. Where to install the remote part can be determined by operators or users according to the system requirements, coverage areas, specific application scenarios, and the like. The radio remote relay node RN0 can be fixed, mobile or nomadic.

As shown in FIG. 4, the radio remote relay node RN0 has three antennas: Ant0, Ant1 and Ant2, covering designated areas respectively. The coverage areas of the three antennas may be overlapped. In practice, a radio remote RN may have more antennas. More radio remote RNs may participate in the data forwarding in the network. There may be no simple RN in the network as well.

In the data forwarding branch as shown in FIG. 4, after receiving data transmitted from the source node SN to the target node TN2, the radio remote relay node RN0 transmits the data from the antenna Ant2 closest to the target node TN2. After receiving data transmitted from the target node TN2 to the source node SN, the radio remote node RN0 transmits data by the antenna Ant1 which is closest to the subordinate forwarding node RN1.

Figure 5:
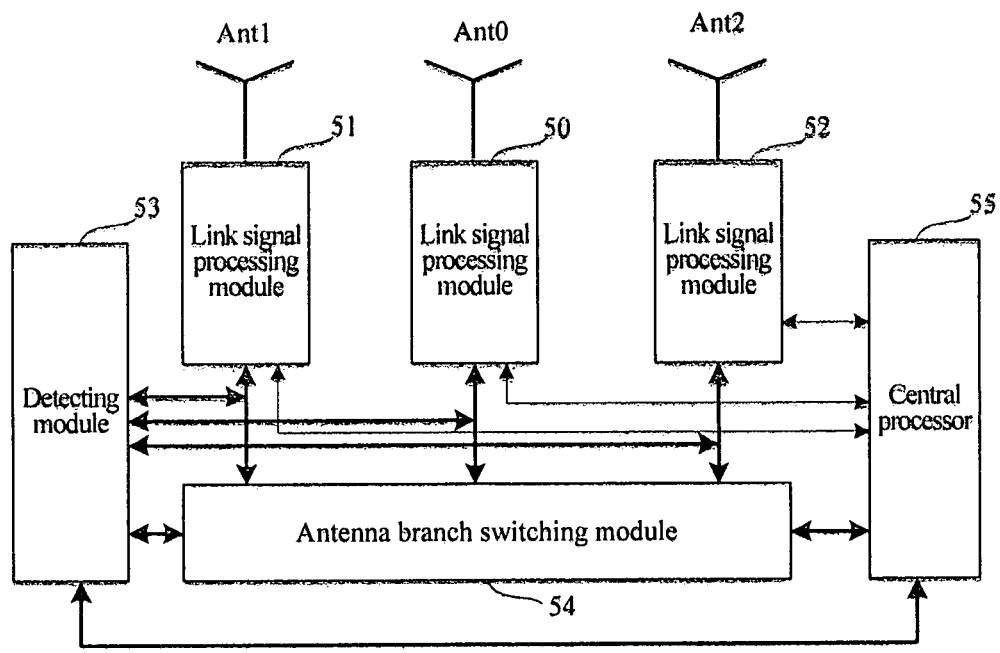
FIG. 5 is a schematic diagram illustrating the structure of a radio remote RN according to an embodiment of the present invention.

FIG. 5 shows a schematic diagram illustrating the structure of a radio remote relay node RN according to an embodiment of the present invention. As shown in FIG. 5, the radio remote relay node RN includes three antennas: Ant0, Ant1 and Ant2, three link signal processing modules 50, 51, and 52, a detecting module 53, an antenna branch switching module 54, and a central processor 55.

Antennas Ant0, Ant1, and Ant2 are used to send and receive signals in designated areas respectively, and can be set in the place remote from control part of RN.

The link signal processing modules 50, 51 and 52 are respectively connected with the antennas Ant0, Ant1, and Ant2, and are used to process signals received from the antennas and signals to be transmitted via the antennas, for example, implementing a series of signal processing functions such as frequency conversions in uplink and downlinks, encoding/decoding, modulation/demodulation, etc. to guarantee that the signals at the antenna end are radio signals, while at the antenna branch switching module end, different user signals should be recognized for successful switch.

The detecting module 53 detects the nodes except the RN itself in the coverage area of each antenna according to signals from the link signal processing modules, saves the corresponding relationship between the users and the antennas (for example, the antennas can be denoted by the port numbers in the switching module) in a database, and updates the database in real time. A certain user may be located at the coverage area of multiple antennas, and the detecting module 53 should select an optimum antenna according to some rules. The optimum antenna may include one or more antennas. At the same time, the detecting module 53 determines whether the target node TN is the node where the detecting module 53 is located. If the target node TN is the node where the detecting module 53 is located, the forwarding procedure is completed; otherwise, the detecting module 53 manages the antenna branch switching module 54 to implement switching, and selects an antenna closest to a subordinate node to send the data. The optimum antenna may be chosen by the RN according to the information written in the database of the detecting module by network managers or others, or according to the signal power received by the each antenna from all the neighboring nodes, or according to other rules.

The antenna branch switching module 54 is used to switch user data in different branches under control instructions inputted by the detecting module.

The central processor 55 is connected with each module in the apparatus, and used to control each module and completing other necessary functions of the RN, such as further processing, switching, controlling, monitoring, timing, and so on.

Taking the forwarding branch as shown in FIG. 4 as an example, the processing procedure of forwarding data is described as below.

Figure 6:
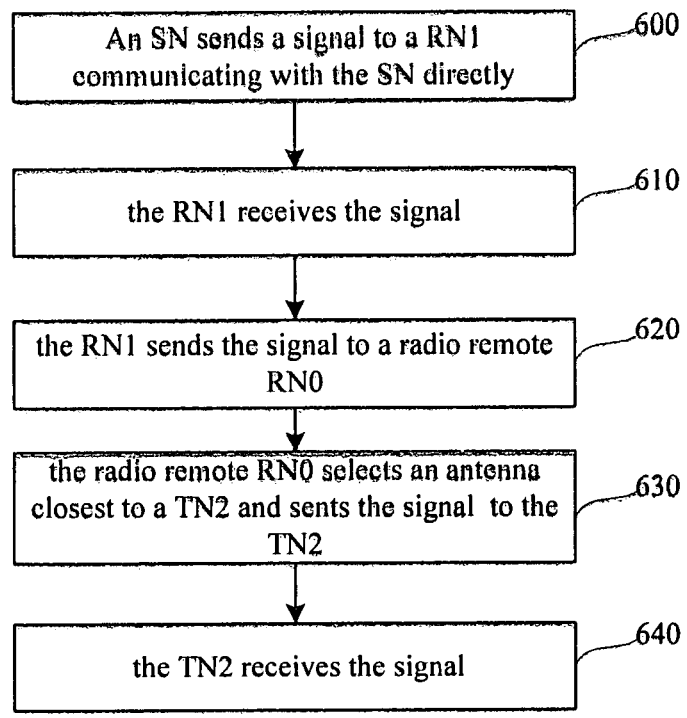
FIGS. 6 and 7 are flow charts illustrating the process of forwarding data according to an embodiment of the present invention.

As shown in FIG. 6, when a source node SN transmits data to a target node TN2, the wireless downlink processing procedure include the blocks as below, and the data is carried by a signal.

Block 600: A source node SN, occupying some radio resources, sends a signal to a relay node RN1 communicating with the SN directly.

Block 610: The relay node RN1 receives the signal.

Upon receiving the signal, the RN can implement related signal processing such as combining, and selecting the signals received from multiple antennas according to the ability of the RN, to acquire a signal with preferable quality.

Block 620: The relay node RN1, occupying some radio resources, sends the signal to a subordinate radio remote relay node RN0.

Block 630: Upon receiving the signal, the radio remote relay node RN0 selects an antenna Ant2 closest to the target node TN2, according to the corresponding relationship between the nodes and the antennas saved by the radio remote relay node RN0, to send the signal, and other antennas are not used to send the signal any more.

In the Block 630, the radio remote relay node RN0 can process the signal according to the category of the RN0.

If the RN0 is an analog RN, amplify the received data, and then send the data.

If the RN0 is an active RN, process the signal received totally according to the local information to change the data format of the signal received, and send the signal processed.

If the RN0 is a half-active RN, process the signal received according to the local information and the control information of a controlling node of itself to change the data format of the signal received, and send the signal processed.

If the RN0 is a passive RN, process the signal received totally according to the control information of a controlling node of itself to change the data format of the signal received, and send the signal processed.

It can be seen that, if the RN0 is a digital RN, data formats of the signal received and the signal transmitted by the RN0 are different.

Block 640: The target node TN2 receives the signal.

Figure 7:
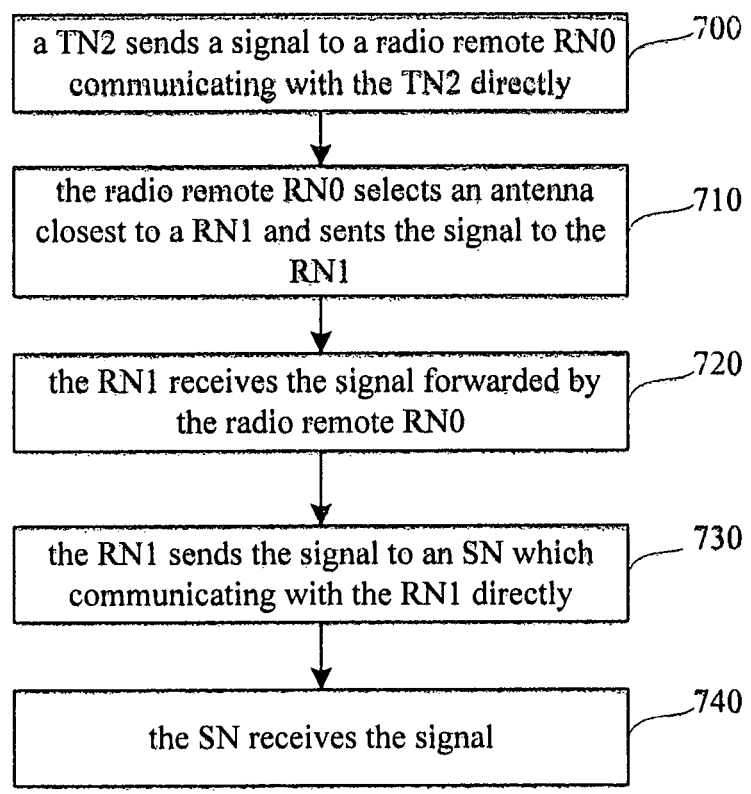

As shown in FIG. 7, when the target node TN2 transmits data to the source node SN, the wireless uplink processing procedure includes the blocks as below, and the data is carried by a signal.

Block 700: The target node TN2, occupying some radio resources, sends a signal to the radio remote relay node RN0 communicating with the TN2 directly.

Block 710: Upon receiving the signal, the radio remote relay node RN0 selects an antenna Ant1 which is closest to the subordinate node RN1 to send the signal, according to the corresponding relationship between the nodes and the antennas saved by the radio remote relay node RN0, and other antennas is not used to send the signal any more.

In the Block 710, the radio remote relay node RN0 can process the signal according to the category of the RN0. Please refer to the description of the Block 630.

Block 720: A relay node RN1 receives the signal forwarded by the radio remote relay node RN0.

Block 730: The relay node RN1, occupying some radio resources, sends the signal to a source node SN communicating with the relay node RN1 directly.

Block 740: The source node SN receives the signal.

In the processes referring to FIGS. 6 and 7, a common RN participates in the data forwarding. But the processes are not limited to this. In the forwarding network, there may be no common RN, and the above-mentioned radio remote RNs forward all data, and the processing procedure of each radio remote RN is the same.

It can be seen from the above that, according to the embodiments of the present invention, wire links are used to replace some or all RN<->RN links. The network can be the same as the typical forwarding network, having the features of flexible networking, reducing transmitting power of the node, enlarging coverage areas, and improving user capacities. Moreover, because wire links are used to replace wireless links, the interference due to the reduced part of RN<->RN links can be decreased. Meanwhile, because the transmission condition of the wire links is much better than that of the wireless links, reducing the hops of the wireless links leads to reducing the probability of data transmission with error.

As the link number for forwarding data is reduced, the radio resources occupied are greatly reduced. For the digital RN, once one hop is reduced, the time for decoding and re-encoding signals is reduced, the system complexity is reduced and the processing time of the system is saved.

Therefore, the scheme according to the embodiments of the present invention can save the radio resources occupied, decrease the transmitting powers of base station and user terminals, degrade the system interference, and reduce the coverage blind spots. According to the embodiments of the present invention, a forwarding network with less hops can be designed (the hop number of a forwarding network can be reduced when the number is greater than two, and the number can be reduced to two at least), thereby reducing the complexity of the forwarding network, and improving the system performance.

Obviously, those skilled in the art may make numerous changes and variations on the solution of the present invention without departing from the spirit and scope thereof. Accordingly, it is intended that the present invention includes the changes and variations in case that such changes and variations come within the scope as set forth in the appended claims and the equivalent techniques thereof.

I claim:

1. A method for forwarding data in a forwarding network, the method comprising:

acquiring, by a radio remote relay node, data transmitted from a Source Node (SN) to a Target Node (TN) in the forwarding network;

defining a corresponding relationship between a plurality of antennas of the radio remote relay node and nodes within coverage areas of the antennas, wherein the plurality of antennas is remote from a main body of the radio remote relay node and connected with the main body of the radio remote relay node through wire transmission media;

selecting from the plurality of antennas at least one antenna corresponding to the TN according to the corresponding relationship between the antennas and the nodes in the coverage areas of the antennas;

sending the data to the selected antenna through wire transmission media between the selected antenna and the main body of the radio remote relay node; and transmitting the data by the selected antenna.

2. The method of claim 1, further comprising:

detecting, by the radio remote relay node, the nodes in the coverage areas of the antennas, and saving the corresponding relationship between the antennas and the nodes.

3. The method of claim 1 wherein selecting the at least one antenna further comprises:

selecting the at least one antenna according to a rule, when detecting that a node is in the coverage areas of a plurality of antennas.

4. The method of claim 1, wherein selecting the at least one antenna further comprises:
selecting the at least one antenna according to power of signals received by each of the plurality of antennas from the node in the coverage areas of the plurality of antennas.

5. The method of claim 1, wherein selecting the at least one antenna further comprises:
selecting the at least one antenna closest to the TN.

6. The method of claim 1, wherein the acquiring the signal transmitted from the SN to the TN comprises:
selecting a signal with preferable quality from signals received from one or more of the plurality of antennas of the radio remote relay node.

7. The method of claim 1, wherein acquiring the signal transmitted from the SN to the TN comprises:
selecting and combining signals received from the plurality of antennas of the radio remote relay node to acquire a signal with preferable quality.

8. The method of claim 1, further comprising:
amplifying the signal upon acquiring the signal.

9. The method of claim 1, further comprising:
changing a data format of the signal according to a category of the radio remote relay node.

10. The method of claim 1, wherein the category of the radio remote relay node comprises at least a one of an active relay node, a half-active relay node, or a passive relay node.

11. An apparatus for forwarding data to a node, comprising:
a plurality of antennas configured to transmit and receive data in designated coverage areas respectively, the plurality of antennas being remote from a main body of the radio remote relay node and connected with the main body of the radio remote relay node through wire transmission media;
a plurality of link signal processing modules, each of which corresponds to a one of the plurality of the antennas and configured to process data received from the corresponding one of the plurality of antennas and to process data to be sent to the corresponding one of the plurality of antennas;
a detecting module configured to detect nodes in designated coverage area of each antenna of the plurality of antennas, save a corresponding relationship between the nodes and the plurality of antennas, and select at least one of the plurality of antennas according to the corresponding relationship between the nodes and the plurality of antennas to transmit a signal; and
an antenna branch switching module, configured to send received data to one of the plurality of link signal processing modules corresponding to the antenna selected by the detecting module for transmission from the selected antenna to the node.

12. The apparatus of claim 11, further comprising:
a central processor, configured to control the plurality of link signal processing modules, the detecting module and the antenna branch switching module.

13. The apparatus of claim 11 wherein the detecting module is further configured to select the antenna according to at least a one of: (1) a rule, when detecting that the node is in the coverage areas of a plurality of antennas, (2) power of signals received by each of the plurality of antennas from the node in the coverage areas of the plurality of antennas, and (3) closest antenna to the node.

14. A forwarding network, comprising:
a source node, configured to transmit data;
a target node, configured to receive the data; and
at least one forwarding node comprising a plurality of antennas for transmitting and receiving signals in designated coverage areas respectively, wherein the plurality of antennas are remote from a main body of the radio remote relay node and connected with the main body of the radio remote relay node through wire transmission media; the at least one forwarding node configured to select an antenna which is closest to the target node or to a subordinate forwarding node from the plurality of antennas according to a corresponding relationship between the plurality of antennas and nodes in coverage areas of the plurality of antennas, send the data to the selected antenna through wire transmission media between the selected antenna and the main body of the radio remote relay node, and transmit the data by the selected antenna to the target node or to the subordinate forwarding node.

15. The forwarding network of claim 14, wherein the forwarding node further comprises:
a plurality of link signal processing modules, each of which corresponds to a one of the plurality of the antennas and configured to process data received from the corresponding one of the plurality of antennas and to process data to be sent to the corresponding one of the plurality of antennas;
a detecting module configured to detect nodes in a coverage area of each antenna of the plurality of antennas, save a corresponding relationship between the nodes and the plurality of antennas, and select an antenna which is closest to the target node or to a subordinate forwarding node from the plurality of antennas according to the corresponding relationship between the nodes and the plurality of antennas to transmit the signal;
an antenna branch switching module, configured to send received data to one of the plurality of link signal processing modules corresponding to the antenna selected by the detecting module for transmission from the selected antenna to the node.

16. A radio remote relay node for forwarding data in a network, comprising:
a plurality of antennas for transmitting and receiving data signals, the plurality of antennas being remote from a main body of the radio remote relay node and connected with the main body of the radio remote relay node through wire transmission media; and
wherein the radio remote relay node is configured to:
acquire data transmitted from a Source Node (SN) to a Target Node (TN) in the network;
select at least one antenna from the plurality of antennas which corresponds to a node that is closest to the TN according to a corresponding relationship between the antennas and the nodes within coverage areas of the respective antennas;
sending the data to the selected antenna through wire transmission media between the selected antenna and the main body of the radio remote relay node; and
transmitting the data by the selected antenna to the node.

17. The radio remote relay node of claim 16, wherein the remote relay node is further configured to select the at least one antenna according to a rule, when detecting that the node is in coverage areas of the plurality of antennas.

18. The radio remote relay node of claim 16, wherein the remote relay node is further configured to select the at least one antenna according to power of signals received by each of the plurality of antennas from the node in the coverage areas of the plurality of antennas.

19. The radio remote relay node of claim 16, wherein the remote relay node is further configured to select the at least one antenna as the antenna that is closest to the node.

* * * * *